(12) United States Patent
Taves

(10) Patent No.: US 11,512,814 B2
(45) Date of Patent: Nov. 29, 2022

(54) GAS CYLINDER MOBILITY AID

(71) Applicant: Richard Bradley Taves, Guelph (CA)

(72) Inventor: Richard Bradley Taves, Guelph (CA)

(73) Assignee: Richard Bradley Taves, Guelph (CA)

( * ) Notice: Subject to any disclaimer, the term of this patent is extended or adjusted under 35 U.S.C. 154(b) by 245 days.

(21) Appl. No.: 17/032,285

(22) Filed: Sep. 25, 2020

(65) Prior Publication Data

US 2022/0099254 A1   Mar. 31, 2022

(51) Int. Cl.
*F17C 13/08* (2006.01)
*B33Y 80/00* (2015.01)
*F17C 1/14* (2006.01)

(52) U.S. Cl.
CPC ............ *F17C 13/083* (2013.01); *B33Y 80/00* (2014.12); *F17C 1/14* (2013.01); *F17C 2205/0165* (2013.01); *F17C 2205/0169* (2013.01)

(58) Field of Classification Search
CPC ................. F17C 13/08; F17C 13/083; F17C 2205/0165; B65D 25/28; B65D 25/282; B65D 25/2826; A45F 5/10
USPC ...... 220/759, 755, 768, 769; 16/425; 294/25, 294/27.1, 33, 68.1, 137, 148, 149, 166, 294/902
See application file for complete search history.

(56) References Cited

U.S. PATENT DOCUMENTS

| | | | | |
|---|---|---|---|---|
| 1,353,050 A | * | 9/1920 | Lambrakos | ........ B65D 25/2876 220/759 |
| 3,363,927 A | * | 1/1968 | Wesemann | ............... B65G 7/12 294/92 |
| 4,560,193 A | * | 12/1985 | Beebe | ................... F17C 13/084 294/119.2 |
| 5,513,939 A | | 5/1996 | Martin et al. | |
| 6,042,164 A | * | 3/2000 | Merritt | ................. B65D 23/104 294/27.1 |
| 6,311,722 B1 | * | 11/2001 | Gounot | ................... F17C 13/06 137/382 |
| 7,131,618 B2 | | 11/2006 | Berry et al. | |
| 8,215,517 B2 | | 7/2012 | Chohfi et al. | |

(Continued)

FOREIGN PATENT DOCUMENTS

| CN | 2093953 U | 1/1992 |
|---|---|---|
| CN | 203753831 U | 8/2014 |

(Continued)

OTHER PUBLICATIONS

Calhome, "4ft. Min Sliding Barn Wooden Door Hardware for Cabinet and TV Stand Steel Track Roller Hanging Kit," retrieved from https://www.homedepot.com/p/CALHOME-4-ft-Mini-Sliding-Barn-Wooden-Door-Hardware-for-Cabinet-and-TV-Stand-Steel-Track-Roller-Hanging-Kit (Year: 2018).*

*Primary Examiner* — John K Fristoe, Jr.
*Assistant Examiner* — Laura E. Parker
(74) *Attorney, Agent, or Firm* — Stratford Group Ltd.

(57) ABSTRACT

A gas cylinder mobility aid is provided. A gas cylinder mobility aid for attachment to a collar of a gas cylinder, comprising a base plate having an upper surface and a lower surface. One or more coupling members affixed to the lower surface of the base plate wherein the one or more coupling members are positioned to form a frictional fit with the collar of the gas cylinder. A vertical member affixed at the center of said base plate and a handle rotatably attached to the vertical member such that the handle is present above the upper surface of the base plate and the handle rotates about the vertical member.

15 Claims, 7 Drawing Sheets

(56) References Cited

U.S. PATENT DOCUMENTS

| | | |
|---|---|---|
| 9,446,777 B2 | 9/2016 | Umbro et al. |
| 2013/0341381 A1* | 12/2013 | Thomason ............. B65D 25/28 |
| | | 229/117.09 |
| 2016/0272337 A1* | 9/2016 | Me ......................... B64D 37/04 |
| 2017/0057732 A1 | 3/2017 | Shivers et al. |
| 2017/0106709 A1* | 4/2017 | Lauer ..................... B60G 11/28 |
| 2019/0093827 A1* | 3/2019 | Yeggy ................... F17C 13/084 |
| 2020/0239192 A1* | 7/2020 | Maurier ................ B65D 25/24 |
| 2021/0015245 A1* | 1/2021 | Ivanenko ................ A45F 5/102 |
| 2022/0042653 A1* | 2/2022 | Aguiar .................. F17C 13/084 |

FOREIGN PATENT DOCUMENTS

| | | | |
|---|---|---|---|
| CN | 208993703 U | 6/2019 | |
| EP | 2857734 A2 * | 4/2015 | ................ F17C 1/00 |
| JP | 0572649 U | 10/1993 | |

* cited by examiner

GAS CYLINDER MOBILITY AID

FIELD OF THE INVENTION

The present disclosure relates to a gas cylinder mobility aid, more specifically but not by way of limitation, a gas cylinder mobility aid that facilitates the safe transportation of gas cylinders.

BACKGROUND

The safe, efficient transportation of gas cylinders for delivery drivers, dock filling workers and the like, contributes significantly to both business and work prosperity. Typically, workers within this field manually transport the gas cylinders either through strenuous, repetitive lifting or through the two-handed rotation of one or a stack of gas cylinders forward. These methods are both highly time consuming and potentially hazardous to the workers in the short term and long term.

U.S. Pat. No. 9,446,777 B2 (Umbro et al.) discloses a wheeled carrier with brakes. Shortcomings include a time consuming and strenuous setup of the propane gas tanks onto the carrier, the bulkiness of the carrier which requires additional storage space and restricts portability.

U.S. Pub. No. 2017/0057732 A1 (Shivers et al.) discloses a portable gas cylinder crate for providing storage and transportation. Shortcomings include an inability address the weight and strain for the user during transportation.

U.S. Pat. No. 5,513,939 B2 (Martin et al.) discloses a two-wheeled lifting device for a propane tank. Shortcomings include a time consuming and strenuous setup and securing of the propane gas tanks onto the lifting, the bulkiness of the device which requires additional storage space and restricts portability.

C.N. Pub. No. 2,093,953 U (Xin, Pan) discloses a wheeled carrier track roller frame. Shortcomings include an inability to easily transfer the device onto a plurality of cylinders for safe, effective and effortless transportation.

C.N. Pub. No. 203,753,831 U (Xin, Chen) discloses a gas cylinder trolley. Shortcomings include a time consuming and strenuous setup for loading the propane gas tanks into the trolley, the bulkiness of the trolley which requires additional storage space and restricts portability.

C.N. Pub. No. 208,993,703 U (Dingding et al.) discloses an inverted gas cylinder traveling bogie. Shortcomings include a time consuming instillation onto an existing trolley and the bulkiness of the device which requires additional storage space and restricts portability.

J.P.H. Pub. No. 572,649 U (Nakatsu et al.) discloses a transfer tool for containers that facilitates the transfer on snow or frozen roads and loading and unloading containers. Shortcomings include a time consuming setup required for each container as well as the potential incompatibility of this tool for some container structures.

All documents cited herein are incorporated by reference. There is a need for a gas cylinder mobility aid that is ergonomic, conducive to lessening workplace injuries during gas cylinder transportation, durable, inexpensive to manufacture and maintain, simple to employ, lightweight and stow-able.

BRIEF SUMMARY

It is the object of the present invention to provide a gas cylinder mobility aid. A gas cylinder mobility aid for attachment to a collar of a gas cylinder, comprising a base plate having an upper surface and a lower surface. One or more coupling members affixed to the lower surface of the base plate wherein the one or more coupling members are positioned to form a frictional fit with the collar of the gas cylinder. A vertical member affixed at the center of said base plate and a handle rotatably attached to the vertical member such that the handle is present above the upper surface of the base plate and the handle rotates about the vertical member.

In accordance with an aspect of the invention, there is provided a method of employing the gas cylinder mobility aid to facilitate safe transportation of the gas cylinder, comprising applying the one or more coupling members to the collar of said gas cylinder such that the frictional fit is formed. Tilting the gas cylinder. Applying a rotational force to the gas cylinder and securing the handle and guiding the gas cylinder via the handle.

In accordance with an aspect of the invention, there is provided a gas cylinder mobility aid kit for facilitating safe transportation of one or more gas cylinders, the kit comprising a base plate, a plurality of coupling members, a vertical member, a handle, and a plurality of fasteners.

In accordance with an embodiment of the invention, the base plate is rectangular, square or circular.

In accordance with an embodiment of the invention, the one or more coupling members are attached at opposing lengths of the lower surface of the base plate.

In accordance with an embodiment of the invention, the one or more coupling members are attached at a plurality of one or more corners of the base plate.

In accordance with an embodiment of the invention, the one or more coupling members are attached at a plurality of sides of the lower surface of the base plate.

In accordance with an embodiment of the invention, a plurality of the coupling members are attached equidistant from one another on the lower surface of the base plate.

In accordance with an embodiment of the invention, a finger guard is attached to the vertical member.

In accordance with an embodiment of the invention, the finger guard is built into said base plate.

In accordance with an embodiment of the invention, the handle is spherically shaped.

In accordance with an embodiment of the invention, the gas cylinder mobility aid is manufactured as a single unit.

In accordance with an embodiment of the invention, one or more from a group comprising of the base plate, the one or more coupling members, the vertical member and the handle are manufactured by a 3-D printer.

In accordance with an embodiment of the invention, the gas cylinder mobility aid transports two or more gas cylinders.

In accordance with an embodiment of the invention, the gas cylinders may be stacked on top of each other.

In accordance with an embodiment of the invention, the kit further comprises a finger guard.

In accordance with an embodiment of the invention, the handle is spherically shaped.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

A gas cylinder mobility aid, presented hereafter, is operatively associated with a collar of a gas cylinder to achieve safe, efficient transportation of one or more gas cylinders for various delivery and dock workers. The gas cylinder mobility aid reduces strain associated with heavy, repetitive carrying of gas cylinders and greatly diminishes the hazards associated when rotating one or a stack of gas cylinders forward.

Figure 1:
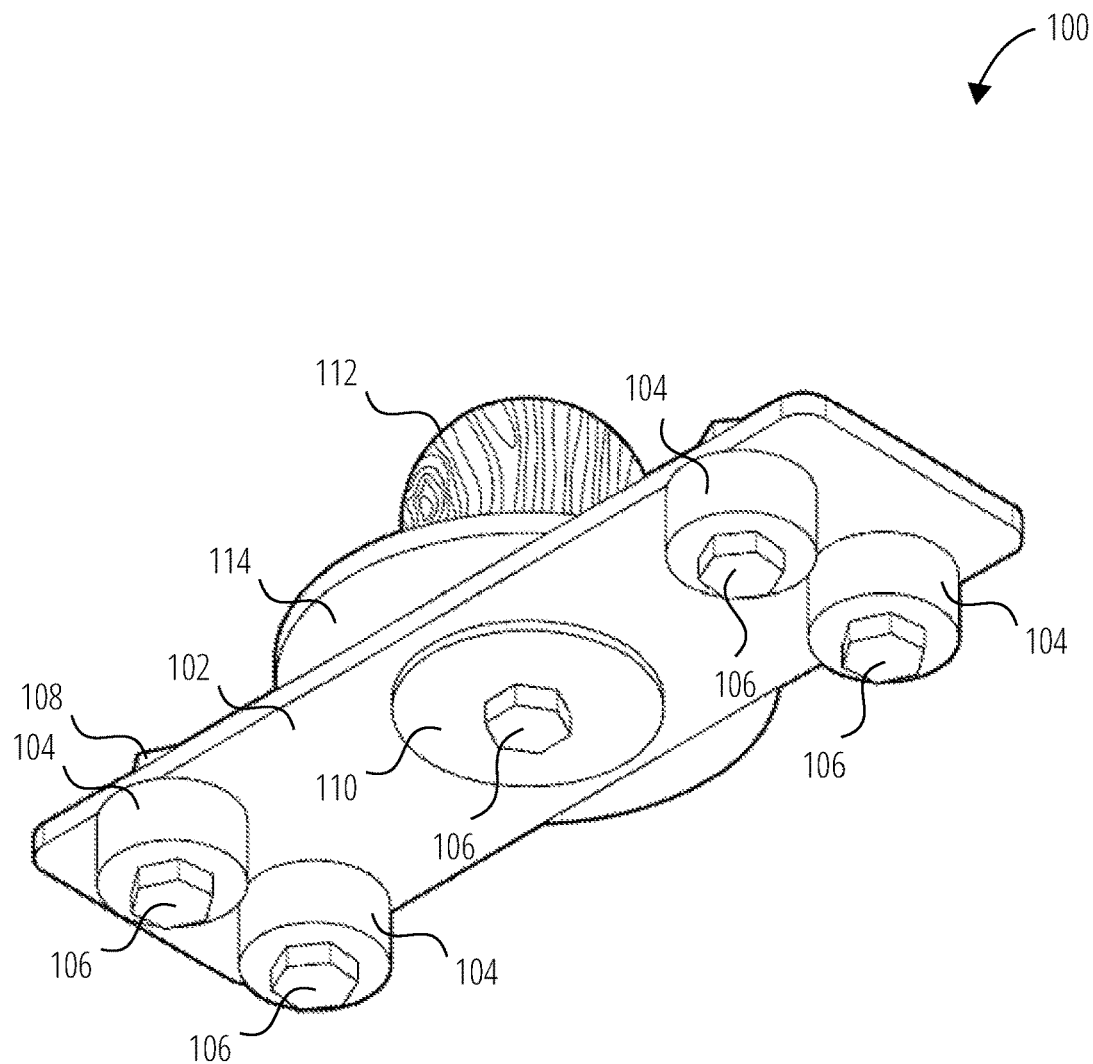
FIG. 1 illustrates an aspect of the subject matter in accordance with one embodiment.

FIG. 1 depicts a perspective view 100 of a gas cylinder mobility aid as in one embodiment. The gas cylinder mobility aid is employed for facilitating safe transportation of one or more gas cylinders, such as but not limited to, thirty three pound aluminum cylinders. The gas cylinder mobility aid is attached to an inner surface of the collar of a gas cylinder and comprises a base plate 102 with an upper surface and a lower surface. One or more coupling members 104 are affixed to the lower surface of the base plate 102 wherein the one or more coupling members 104 are positioned to form a frictional fit with the collar of the gas cylinder.

In FIG. 1, the one or more coupling members 104 are shown as rubber bushings, and the base plate 102 is shown as a rectangular plate. The one or more coupling members 104 may be affixed at opposing lengths of the lower surface of the base plate 102. In alternative embodiments, the one or more coupling members 104 may be affixed at a plurality of one or more corners of the base plate 102. Other shapes of base plates 102, such as square or circular, are considered to be within the scope of other embodiments of the invention. Similarly, the one or more coupling members 104 may be affixed at a plurality of sides of the lower surface of the base plate 102. Additionally, the one or more coupling members 104 may be affixed at a plurality of one or more corners of the base plate 102. Furthermore, a plurality of coupling members 104 may be affixed equidistant from one another on the lower surface of the base plate 102. In the embodiment having a circular base plate 102, the one or more coupling members 104 may comprise one continuous coupling member 104 positioned around the circumference of the base plate 102, or a plurality of coupling members 104 positioned around the circumference of the base plate 102.

In FIG. 1, two rubber bushings are affixed to a distal end of the lower surface of the base plate 102 and are each secured in place by a steel lock nut 106. Other fasteners in the art such as, but not limited to, screws 108, washers 110 and spacers may be further employed in the assembly of the gas cylinder mobility aid.

The gas cylinder mobility aid further comprises a vertical member, not presently shown in FIG. 1, affixed at the center of the base plate 102, and a handle, displayed in FIG. 1 as a spherical handle 112, rotatably attached to the vertical member such that the handle is present above the upper surface of the base plate 102 and the handle rotates about the vertical member. During assembly, the vertical member may be passed through a hole in the base plate 102 and extend vertically at a right angle from the upper surface of the base plate 102. In some embodiments, the vertical member comprises a first end and a second end where the handle is attached at the first end of the vertical member and the base plate 102 is attached at the second end of the vertical member.

The base plate 102, one or more coupling members 104, the vertical member and the finger guard 114 may be fixed together such that only the spherical handle 112 is able to rotate. In some embodiments, the finger guard 114 may be built into the base plate 102. In some embodiments, the gas cylinder mobility aid contains an attachment member affixed to the lower surface of the base plate 102 opposite to the handle. In other embodiments, the attachment member is attached to the vertical member at the end opposite to the handle. In other embodiment, the handle is fixed while the base plate 102, the vertical member and the coupling members 104 rotate during transportation. In some embodiments, the attachment member couples to a user's belt.

Within FIG. 1, the vertical member, such as but not limited to a socket cap head screw, is enclosed within the spherical handle 112, finger guard 114, base plate 102, washer 110 and steel lock nut 106 assembly. The assembly presented provides durability while remaining inexpensive to manufacture and maintain. Additionally, the gas cylinder mobility aid may be manufactured to be lightweight, thus providing effortless portability and stowability. The gas cylinder mobility aid may be manufactured in a variety of different sizes to fit various different gas cylinder dimensions.

Figure 2:
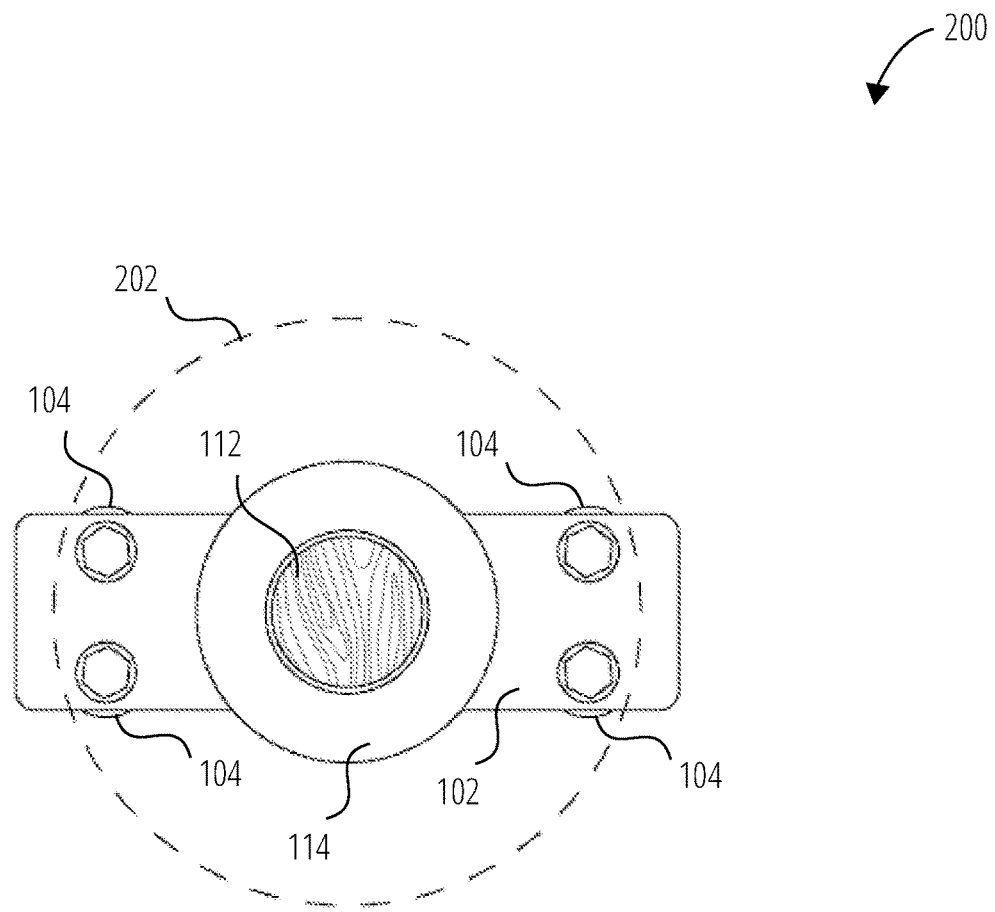
FIG. 2 illustrates an aspect of the subject matter in accordance with one embodiment.

FIG. 2 depicts a top view 200 of the gas cylinder mobility aid as in one embodiment. An outline for a gas cylinder collar 202 is present to indicate the orientation of the gas cylinder mobility aid while employed, specifically, the orientation of the coupling members 104 in relation to the gas cylinder collar 202 and the position of the spherical handle 112 in relation to the central axis of the gas cylinder collar 202 is illustrated. The gas cylinder mobility aid utilizes the central axis of the gas cylinder for facilitating effortless and safe transportation during rotation of the one or more gas cylinders, while reducing time spent during transportation dramatically. Furthermore, the finger guard 114 in the present embodiment is attached to the vertical member, not presently shown, and utilized to prevent the user's fingers and hands from becoming caught between the base plate 102 and the gas cylinder collar 202 during employment of the gas cylinder mobility aid.

Figure 3:
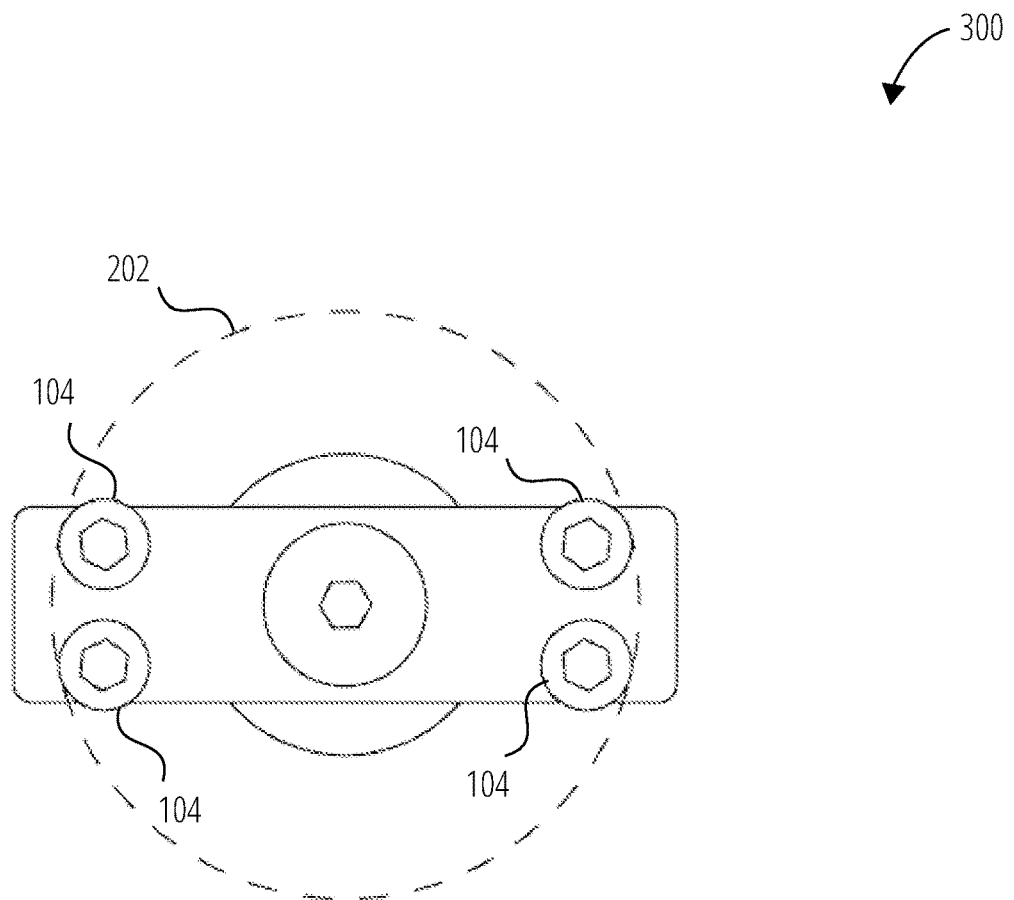
FIG. 3 illustrates an aspect of the subject matter in accordance with one embodiment.

FIG. 3 depicts a bottom view 300 of the gas cylinder mobility aid as in one embodiment. In this embodiment, the outline for a gas cylinder collar 202 further demonstrates the seating of the coupling members 104 onto the inner gas cylinder collar 202. The coupling members 104 engage and are positioned into place along an inner circumference of the gas cylinder collar 202 such that a frictional fit is formed while overcoming any rough or damaged surface of the inner gas cylinder collar 202. In other embodiments, the coupling members 104 engage and are positioned into place along an outer circumference of the gas cylinder collar 202 such that a frictional fit is formed. In another embodiment, the gas cylinder mobility aid is manufactured as a single unit. In some embodiments, one or more of the base plate 102, the one or more coupling members 104, the vertical member and the handle are manufactured by a 3-D printer. In other embodiments, one or more of the base plate 102, the one or more coupling members 104, the vertical member and the handle are manufactured by an injection molding.

Figure 4:
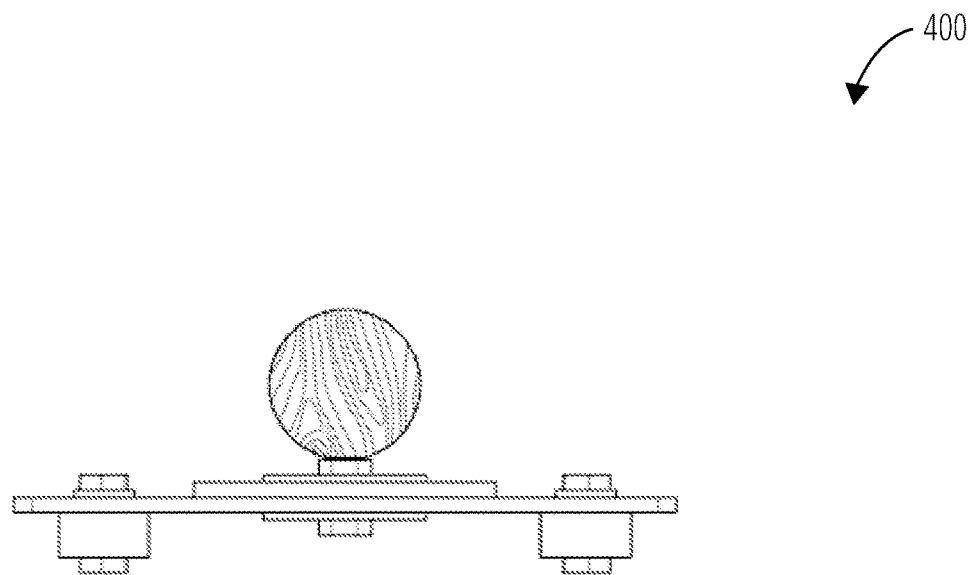
FIG. 4 illustrates an aspect of the subject matter in accordance with one embodiment.

FIG. 4 depicts a front view 400 of the gas cylinder mobility aid as in one embodiment.

Figure 5:
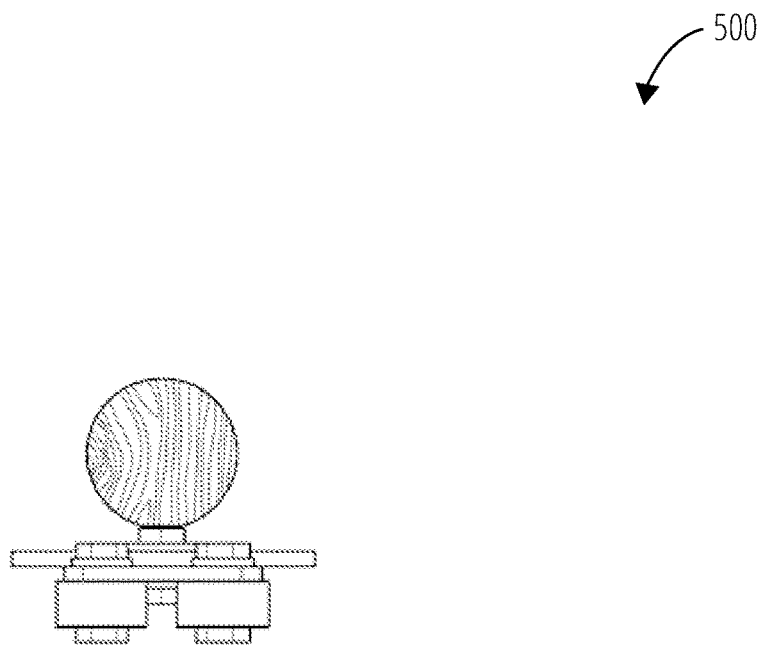
FIG. 5 illustrates an aspect of the subject matter in accordance with one embodiment.

FIG. 5 depicts a side view 500 of the gas cylinder mobility aid as in one embodiment.

Figure 6:
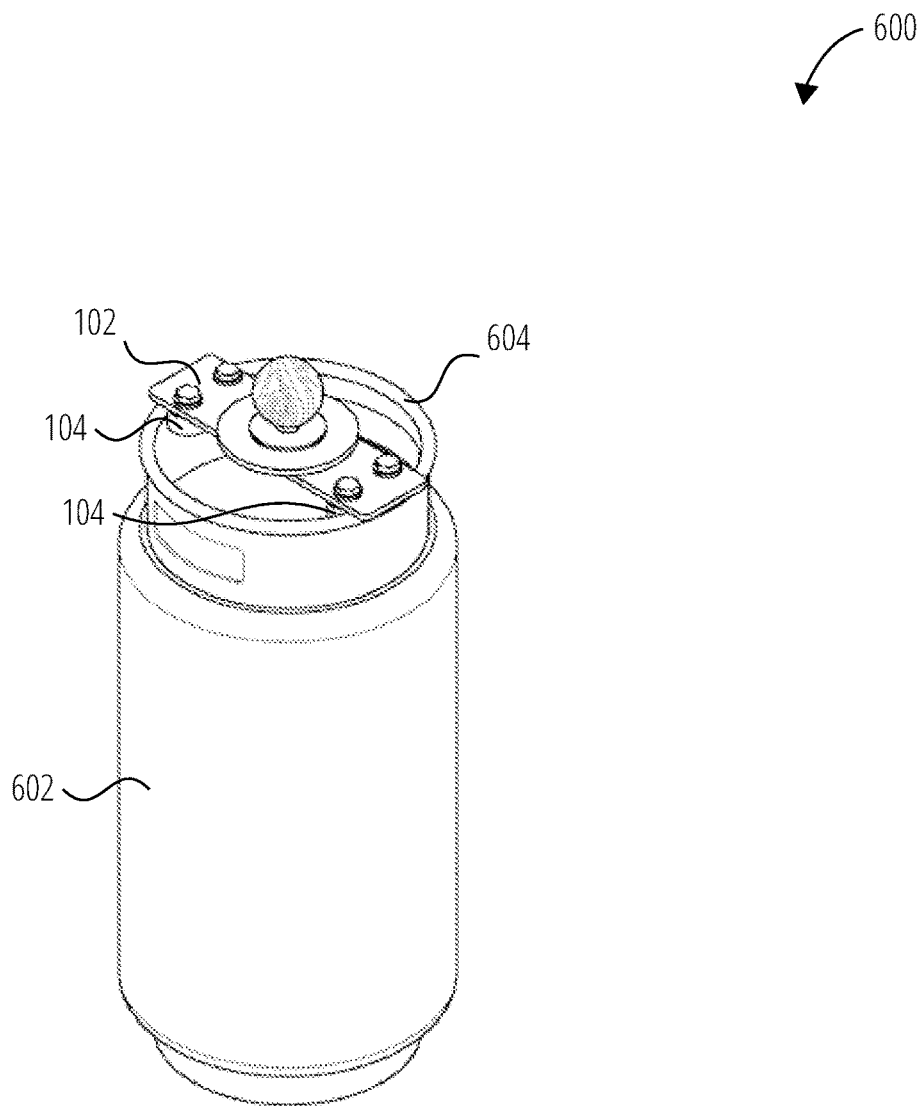
FIG. 6 illustrates an aspect of the subject matter in accordance with one embodiment.

FIG. 6 depicts a single gas cylinder application 600 of the gas cylinder mobility aid as in one embodiment. A method of employing the gas cylinder mobility aid to facilitate safe transportation of a gas cylinder 602 comprises applying the one or more coupling members 104 to the collar 604 of the gas cylinder 602 such that a frictional fit is formed. Next, the user tilts the gas cylinder 602, which may be at angle of approximately three degrees for example. Furthermore, the user applies a rotational force to the gas cylinder 602 while securing the handle and guiding the gas cylinder 602 via the handle.

After positioning the gas cylinder mobility aid to the gas cylinder 602 and tilting the gas cylinder 602, the user exerts an initial force to rotate the gas cylinder 602 but very few, if any, other exertions by the user are required thereafter. The ease of use is due to the combination of the frictional fit of the coupling members 104 against the collar 604 in combination with the rotation of the handle. The gas cylinder mobility aid allows for single-handed employment of the apparatus once the rotation of the gas cylinder has begun and simple guidance of the gas cylinder 602 towards a targeted destination during rotation as oppose to most other methods which require constant two-handed operation. In some embodiments, the method may be further employed to transport two or more gas cylinders 602. In other embodiments, the method may be further employed such that the gas cylinders 602 are stacked on top of each other such as in FIG. 7.

Figure 7:
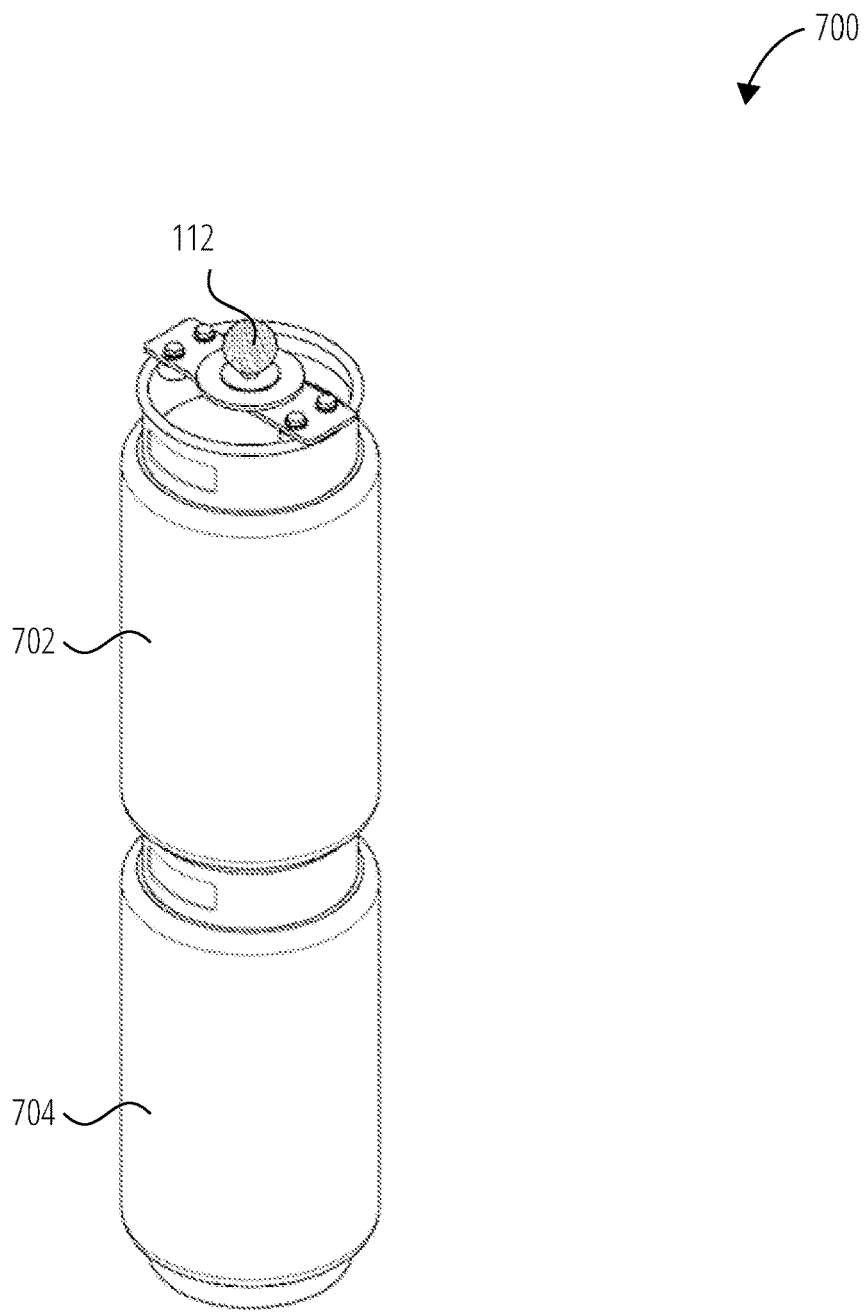
FIG. 7 illustrates an aspect of the subject matter in accordance with one embodiment.

FIG. 7 depicts a multiple gas cylinder application 700 of the gas cylinder mobility aid as in one embodiment. This embodiment shows an example where a gas cylinder 602 may be stacked such that a top gas cylinder 702 rest on top of a bottom gas cylinder 704. The gas cylinder mobility aid may be employed to the top gas cylinder 702 in the stack and applied in the same manner previously stated to facilitate safe transportation.

The considerable weight of a single or stacked gas cylinders 602 may be hazardous in the event of a sudden deviation from the intended path or an unexpected collapse of a stack of gas cylinders 602. Handle shapes may be employed, such as but not limited to, oblate, prolate, spherical handles 112 or other such shapes that prevent the user's fingers or hands from becoming lodged within the handle. These handles may be manufactured from materials, such as but not limited to, hardwood, which is cost quite effective or polycarbonate, which provides durability.

A gas cylinder mobility aid kit for facilitating safe transportation of one or more gas cylinders 602 comprises a base plate 102, a plurality of coupling members 104, a vertical member, a handle and a plurality of fasteners. In some embodiments, the gas cylinder mobility aid kit further comprises a finger guard 114. In some embodiments, the handle is spherically shaped.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A gas cylinder mobility aid for attachment to a collar of a gas cylinder, comprising:
   a base plate having an upper surface and a lower surface;
   one or more rubber bushings affixed to said lower surface of said base plate wherein said one or more rubber bushings are positioned to form a frictional fit with said collar of said gas cylinder;
   a vertical member affixed at the center of said base plate; and
   a handle rotatably attached to said vertical member such that said handle is present above said upper surface of said base plate and said handle rotates about said vertical member.

2. The gas cylinder mobility aid of claim 1, wherein said base plate is rectangular.

3. The gas cylinder mobility aid of claim 2, wherein one or more rubber bushings are attached at opposing lengths of said lower surface of said base plate.

4. The gas cylinder mobility aid of claim 2, wherein one or more rubber bushings are attached at a plurality of one or more corners of said base plate.

5. The gas cylinder mobility aid of claim 1, wherein one or more rubber bushings are attached at a plurality of sides of said lower surface of said base plate.

6. The gas cylinder mobility aid of claim 1, wherein one or more rubber bushings are attached at a plurality of one or more corners of said base plate.

7. The gas cylinder mobility aid of claim 1, wherein a plurality of said rubber bushings are attached equidistant from one another on said lower surface of said base plate.

8. The gas cylinder mobility aid of claim 1, wherein a finger guard is attached to said vertical member.

9. The gas cylinder mobility aid of claim 8, wherein said finger guard is built into said base plate.

10. The gas cylinder mobility aid of claim 1, wherein said handle is spherically shaped.

11. The gas cylinder mobility aid of claim 1, wherein said gas cylinder mobility aid is manufactured as a single unit.

12. The gas cylinder mobility aid of claim 1, wherein one or more from a group comprising of said base plate, said one or more rubber bushings, said vertical member and said handle are manufactured by a 3-D printer.

13. A method of employing said gas cylinder mobility aid from claim 1, to facilitate safe transportation of said gas cylinder, comprising:
   applying said one or more rubber bushings to said collar of said gas cylinder such that said frictional fit is formed;

tilting said gas cylinder;
applying a rotational force to said gas cylinder; and
securing said handle and guiding said gas cylinder via said handle.

14. The method of employing said gas cylinder mobility aid from claim 13, wherein said gas cylinder mobility aid transports two or more gas cylinders.

15. The method of employing said gas cylinder mobility aid from claim 14, wherein said gas cylinders are stacked on top of each other.

* * * * *